United States Patent [19]

Bates et al.

[11] Patent Number: 5,081,607
[45] Date of Patent: Jan. 14, 1992

[54] ARITHMETIC LOGIC UNIT

[75] Inventors: Matthew D. Bates, Winchester; Nicholas D. Butler, Romsey; Adrian C. Gay, Fareham; Jong H. Kim, Morden; Roderick M. West, Chandlers Ford, all of England

[73] Assignee: International Business Machines Corporation, Armonk, N.Y.

[21] Appl. No.: 483,859

[22] Filed: Feb. 23, 1990

[30] Foreign Application Priority Data

Feb. 27, 1989 [GB] United Kingdom ............... 8904392

[51] Int. Cl.⁵ ......................... G06F 7/50; G06F 7/38
[52] U.S. Cl. .................................. 364/787; 364/749
[58] Field of Search ............... 364/784, 786, 787, 788, 364/749

[56] References Cited

U.S. PATENT DOCUMENTS 3,683,163  8/1972  Hanslip ............................... 364/749
4,707,800 11/1987  Montrone et al. .................. 364/786
4,901,270  2/1990  Galbi et al. ......................... 364/786
4,942,549  7/1990  Jutand et al. ....................... 364/787

Primary Examiner—Gary V. Harkcom
Assistant Examiner—Long T. Nguyen
Attorney, Agent, or Firm—William A. Kinnaman, Jr.

[57] ABSTRACT

A digital arithmetic logic unit in which the carry chain is subdivided into a series of bit fields allowing independent and simultaneous data manipulation to be undertaken in each of the bit fields. Division of the carry chain is achieved via a carry chain selector consisting of a series of multiplexers, one being placed between each pair of adjacent stages of the carry chain. Each multiplexer has two data inputs, one of which forms the carry to the next stage of the carry chain. The carry selected either continues the computation or defines the end of one bit field and provides the least significant carry-in bit to the next bit field. This selection of the carry by the multiplexer is under control of a programmable register, thus allowing variable division of the carry chain.

12 Claims, 2 Drawing Sheets

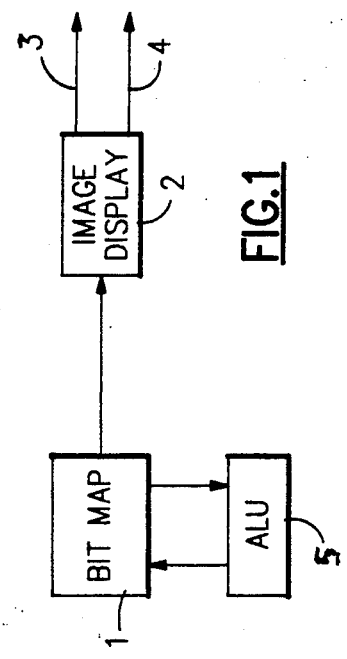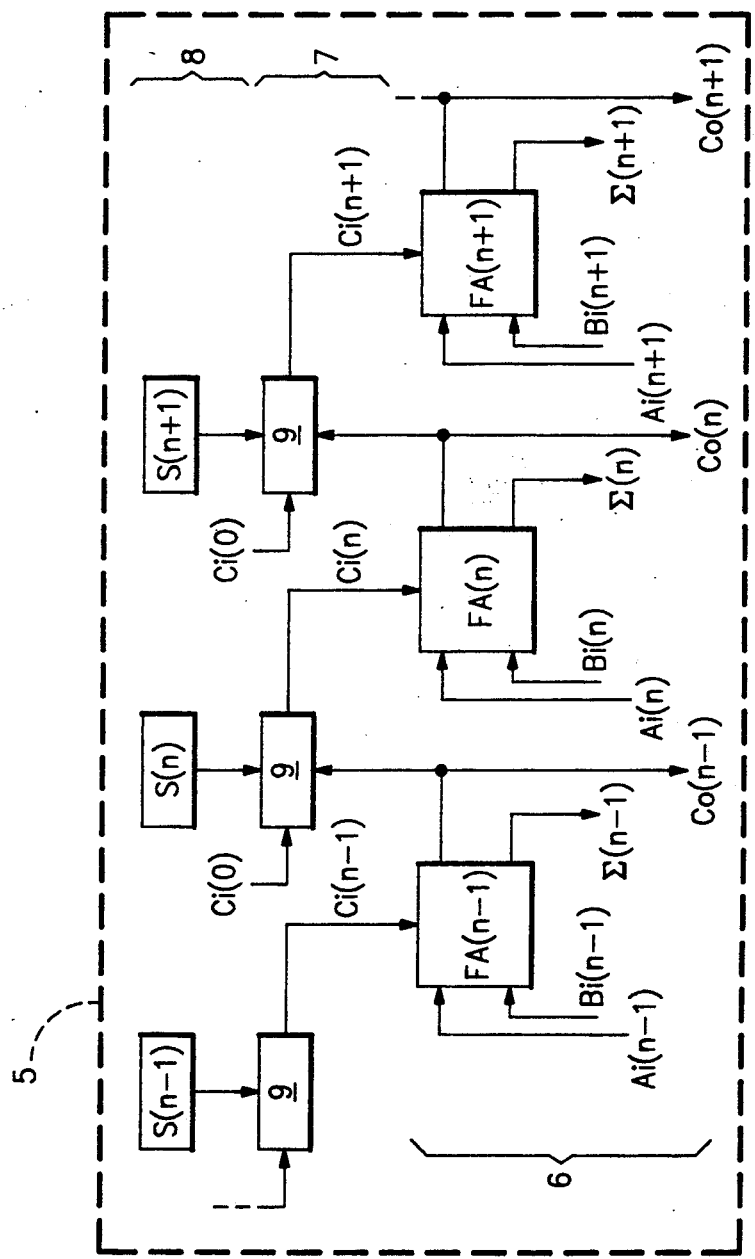

ARITHMETIC LOGIC UNIT

BACKGROUND OF THE INVENTION

1. Field of the Invention

This invention relates to an arithmetic logic unit (ALU), especially one forming part of a graphics processor.

2. Description of the Related Art

The central functions of a computer require arithmetic and logical operations to be performed upon data stored in its memory. An arithmetic logic unit forms the basis of such operations. Data is supplied to the ALU, an arithmetic or logical operation performed, and the resulting data set transferred from the unit and utilized elsewhere within the computer system.

Binary adders are well known in the art and perform the core function of the ALU. A binary adder consists of a chain (the carry chain) of connected bit stages (adders). With the exception of the least significant stage at the start of the chain (which is usually a half as opposed to a full adder), they receive three inputs: the two bits to be added and the carry from the previous stage. Two outputs are generated: a sum and a carry, which is output to the next stage. In turn this produces a carry out of the following stages and so on as it ripples through the binary adder.

Within the prior art, efforts have concentrated on increasing the ALU processing speed by accelerating the carry chain propagation. FR-A-2570851 describes a system in which an ALU is divided into two groups of cells of high- and low-order bits, respectively. The calculation and the carry for the lower-order bits follow conventional practice as described above, whereas for the higher-order group there are two chains working in parallel for the calculation and propagation of the carry. One of these high-order chains receives an initial input of 1 and the other 0; each one then computes a result for the high-order part of the chain. A multiplexer receives the true value of the carry from the lower-order bit computation and selects the correct high-order computation.

This prior art allows only the fixed division of the carry chain and ultimately, in the worst case, utilizes the complete length of the chain to perform one operation. Often it would be desirable to divide the carry chain into independent lengths, allowing the ALU to perform individual and separate operations. In a conventional ALU, this can only be achieved by several separate passes through the carry chain, with associated shifting and masking computation being necessary.

It is often desirable, for example in graphics processors, to be able to perform operations on variable-length data, for example 1, 2, 4 or 8 bits representing a picture element (pixel). An object of the invention is to provide an arithmetic logic unit which has general application but has particular advantages for use in a graphics processor in which simultaneous operations can be performed on variably sized bit fields.

SUMMARY OF THE INVENTION

The essence of the present invention is that programmable subdivision of the carry chain using a carry chain selector allows the ALU to operate simultaneously on a number of bit fields, each of arbitrary size, within a larger word.

According to the invention, an arithmetic logic unit comprises a carry chain consisting of a series of bit stages, into which data to be manipulated is supplied, characterized by means for subdividing the chain into a variable number of separate bit fields of arbitrary length, such that independent data manipulation can be performed simultaneously in each of the bit fields. In a preferred embodiment of the invention, the ALU forms part of a graphics processor.

BRIEF DESCRIPTION OF THE DRAWINGS

FIG. 1 is a schematic block diagram of a graphics system incorporating one embodiment of an ALU in accordance with the invention.

FIG. 2 shows part of the ALU of the system shown in FIG. 1.

DESCRIPTION OF THE PREFERRED EMBODIMENTS

Figure 3:
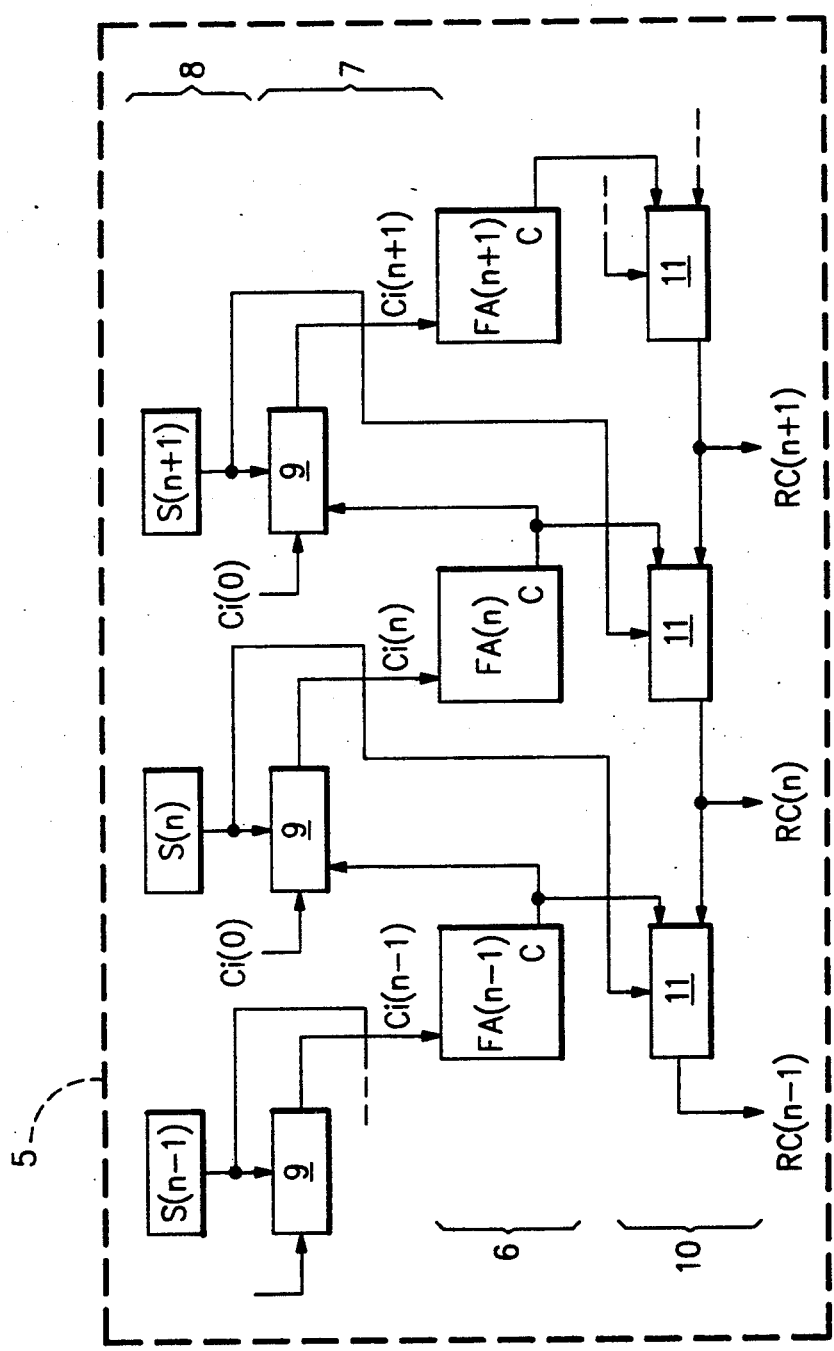
FIG. 3 illustrates an alternative embodiment of an ALU in accordance with the invention, with additional logic.

FIG. 1 illustrates the general design of a graphics display system. Bit map 1 stores data which, read by image display system 2, can be synchronized with an electron beam deflection signal to control a picture on a display screen (outputs 3 and 4). In the simplest case, each bit corresponds to one pixel (picture element) as displayed. For a more sophisticated graphic display system, several bits of data are needed to control the display characteristics of each picture element.

A common requirement for graphics applications is the ability to perform a set of operations on the picture elements, where the two operands are the source pixel data (new data) and the background pixel data already present in the bit map 1. The result is subsequently used to control the nature of the picture on the screen. An ALU 5 can be utilized to modify data stored in the bit map 1, combining source pixel data with the background pixel data using a logic or arithmetic function known as the mix.

Logic mixes operate independently on each bit, whereas arithmetic mixes operate on groups of bits. An addition-type mix, for example, requires that the data be fed into the carry chain 6 of the ALU 5 (FIG. 2) and that carries C be propagated between all the bits taking part in the operation. Division of the carry chain 6 into separate bit fields that operate independently of each other allows the ALU 5 either to operate on smaller pixels or to permit pixel values to be divided into separate components. For example a 16-bit ALU could operate simultaneously either on four-bit pixels or on three fields representing the intensity of red, blue and green components of light for an individual pixel. (Arithmetic operations applied to a pixel of this type must operate on the three components independently; otherwise the results are meaningless).

The ability to subdivide the carry chain 6 into independent bit fields is achieved by utilizing a carry chain selector 7 under the control of a programmable register 8. FIG. 2 shows the basic units 9 of the carry chain selector 7, one unit being placed before each full adder stage FA of the carry chain 6. Thus, for a carry chain k bits wide, k basic units are required (ignoring simplifications that can be made at either end of the chain). Respective bits $A_i$ and $B_i$ of the numbers to be added (A and B) are input to each stage FA of the carry chain 6, alongside a carry-in bit $C_i$ supplied from the preceding carry chain selector unit 9. The outputs from the stage FA are the result from the computation (Σ) and a carry-out bit Co, which is fed to the next carry chain selector unit 9. Each basic unit 9 acts as a gate, more particularly, a multiplexer, and has two data inputs. A zero selects an independent line Ci(0), indicating to carry in bit 0, and a one selects Co(n−1) (carry-out bit (n−1)). The selected bit Ci(0) or Co(n−1) is supplied as the carry-in bit Ci(n) to the corresponding full adder stage FA(n).

The control inputs originate from a k-bit-wide programmable selection register 8, comprising bit stages S, that allows carry chain selection to be under program control. Thus, a zero placed in bit stage S(n) of the selection register 8 causes bit n−1 to be the most significant bit of the field from n to m, where m is the preceding bit with a zero in the corresponding stage S of the selection register 8 and (m−n) is the width of the field. Although in FIG. 2, Ci(0) is shown as a common carry-in bit to the least significant bit of each field, its value could vary between fields and depends only on the operation being carried out. For example, an add would require it to be zero, whereas a subtract would require it to be one. Prior art ALUs do not include the programmable register and the carry chain selector, the carry from each stage of the carry chain being supplied directly to the following stage of the chain.

In another embodiment of the invention, logic can be incorporated into the system in order to detect the status of each bit field; for instance to indicate overflow of the field (FIG. 3). In FIG. 3 a system 5 is illustrated which is similar to that of FIG. 2 except that an extra group 10 of multiplexers 11 is present. Each multiplexer 11 has three inputs: a control input from the corresponding bit stage S of the selection register 8, a first data input comprising a carry C from the corresponding adder stage FA, and a second data input comprising a reflected carry RC from the next multiplexer 11. If a zero is generated on the control line from the selection register 8, then, as in the previous embodiment described above, the end of the bit field is defined. In this case, the carry C from the last adder stage FA for that bit field is fed through all the multiplexers 11 in the bit field to form the reflected carries RC for that bit field. For example, if the final carry out of the last stage FA of the carry chain 6 were one, then this would indicate overflow of the bit field, with all the reflected carries from this field going to logical one. These reflected carries RC could then be used to select a saturated value, instead of the results from the adder stages FA of the bit field, to indicate that overflow had occurred. Clearly, if the carry out from the final adder stage of the bit field were zero, then the reflected carries would be zero and these could in turn be utilized by the system (for example to indicate underflow).

A system has been described in which the carry chain selector is controlled by a programmable register, so that the subdivision of the ALU is dynamically variable under program control. It permits parallel pixel processing and hence faster ALU throughput of data. For example, a 32-bit ALU with a carry chain selector can process eight 4-bit pixels in parallel, and therefore eight times faster than a conventional ALU. It also enables pixel values to be subdivided into separate components; by way of example, a 32-bit wide ALU with the carry chain selector could process two 16-bit-wide pixels, each subdivided into six bits for green and five bits each for red and blue, in parallel and, therefore, at least six times faster than a conventional ALU. Although, for clarity, a simple system has been described, it would be clear to one skilled in the art that the subdivided carry chain system described could be utilized in conjunction with fast carry units in order to further enhance the efficiency of the ALU.

A version of the carry chain selector has been implemented in a 16-bit-wide ALU, the carry chain selector being simplified in that only a limited set of values is permitted in the programmable register. These values are effectively decoded from another register to provide those necessary for partitioning the ALU for eight, four and two bits per pixel. One-bit-per-pixel arithmetic operations are unnecessary as logic mixes can be utilized.

Although attention has been focused on the implementation of the mechanism in systems based on pixel data, the same principles could be applied to any digital ALU where subdivision of the carry chain would allow multiple fields to be processed simultaneously.

While this invention has been particularly shown and described with reference to preferred embodiments thereof, it will be understood by those skilled in the art that various changes in form and details may be made therein without departing from the spirit and scope of the invention.

What is claimed is:

1. An arithmetic logic unit comprising a plurality of successive adder stages, each adder stage receiving a carry-in bit and providing a carry-out bit, respective gates linking adjacent adder stages to form a chain, each of said gates receiving the carry-out bit of the preceding adder stage and providing a carry-in bit to the following adder stage, each of said gates being responsive to a predetermined control input to supply the carry-out bit of the preceding adder stage as a carry-in bit to the following adder stage, and a programmable register for generating the control inputs to said gates, whereby said chain may be subdivided into separate bit fields of one or more adder stages in accordance with the contents of said register.

2. An arithmetic logic unit as in claim 1 in which said register has bit stages corresponding to said gates, each of said gates receiving a control input from the corresponding bit stage of said register.

3. An arithmetic logic unit as in claim 1 in which said adder stages are single-bit stages.

4. An arithmetic logic unit as in claim 1 in which said gates are multiplexers, each of said multiplexers receiving the carry-out bit of the preceding adder stage as a first input and a selectable carry-in bit as a second input.

5. An arithmetic logic unit as in claim 1, further comprising a chain of multiplexers corresponding to said adder stages, each of said multiplexers receiving the carry-out bit of the corresponding adder stage as a first input and the output of the following multiplexer as a second input, each of said multiplexers having a control input for selecting between said first and second inputs, whereby a carry-out bit from a selected adder stage may be reflected along a selected number of multiplexers in accordance with the control inputs supplied thereto.

6. An arithmetic logic unit as in claim 5 in which each of said multiplexers is controlled in common with the gate linking the corresponding adder stage to the following adder stage.

7. An arithmetic logic unit comprising a plurality of successive adder stages, each adder stage providing a carry-out bit to the following adder stage to form a chain, a plurality of multiplexers corresponding to said adder stages, said multiplexers forming a multiplexer chain corresponding to said adder chain, each of said multiplexers receiving the carry-out bit of the corresponding adder stage as a first input and the output of the following multiplexer as a second input, each of said multiplexers having a control input for selecting between said first and second inputs, whereby said chains may be subdivided into separate bit fields of one or more adder stages and multiplexers, with the carry-out bit from the last adder stage in each bit field being reflected along the multiplexers in that field, in accordance with the control inputs supplied to said multiplexers.

8. An arithmetic logic unit as in claim 7, further comprising a programmable register for generating the control inputs to said multiplexers.

9. An arithmetic logic unit as in claim 8 in which said register has bit stages corresponding to said multiplexers, each of said multiplexers receiving a control input from the corresponding bit stage of said register.

10. An arithmetic logic unit as in claim 7, further comprising respective gates forming links between adjacent adder stages, each of said gates receiving the carry-out bit of the preceding adder stage and providing a carry-in bit to the following adder stage.

11. An arithmetic logic unit as in claim 10 in which each of said multiplexers is controlled in common with the gate linking the corresponding adder stage to the following adder stage.

12. An arithmetic logic unit as in claim 11, further comprising a programmable register for generating the control inputs to said gates and said multiplexers.

* * * * *